US006818784B2

United States Patent
Tillack et al.

(10) Patent No.: US 6,818,784 B2
(45) Date of Patent: Nov. 16, 2004

(54) PROCESS FOR PRODUCING ALIPHATIC OLIGOCARBONATE DIOLS

(75) Inventors: Jörg Tillack, Bergisch Gladbach (DE); Jörg Laue, Dormagen (DE); Herbert Witossek, Leipzig (DE); Andreas Schlemenat, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 114 days.

(21) Appl. No.: 10/180,831

(22) Filed: Jun. 26, 2002

(65) Prior Publication Data

US 2003/0009047 A1 Jan. 9, 2003

(30) Foreign Application Priority Data

Jun. 27, 2001 (DE) .......................... 101 30 882

(51) Int. Cl.$^7$ .............................. C07C 69/96
(52) U.S. Cl. ..................................... 558/276
(58) Field of Search .......................... 558/276

(56) References Cited

U.S. PATENT DOCUMENTS

| 2,210,817 A | 8/1940 | Peterson | 260/2 |
| 2,787,632 A | 4/1957 | Stevens | 260/463 |
| 3,544,524 A | 12/1970 | Müller et al. | 260/77.5 |
| 3,631,200 A | 12/1971 | Nehring et al. | 260/463 |
| 4,105,641 A | 8/1978 | Buysch et al. | 526/712 |
| 4,808,691 A | 2/1989 | König et al. | 528/76 |
| 5,116,929 A | 5/1992 | Greco et al. | 528/44 |
| 5,171,830 A | 12/1992 | Grey | 528/371 |
| 5,478,962 A | 12/1995 | De Nardo et al. | 558/277 |
| 5,686,644 A | 11/1997 | Rivetti et al. | 558/277 |
| 6,156,919 A * | 12/2000 | Langer et al. | 558/276 |

FOREIGN PATENT DOCUMENTS

| CA | 2336400 | 1/2000 |
| DE | 857 948 | 12/1952 |
| EP | 0 798 327 | 10/1997 |
| EP | 0 798 328 | 10/1997 |
| GB | 1 263 225 | 3/1969 |
| GB | 1 476 268 | 6/1977 |
| JP | 2001-277417 | 10/2001 |
| JP | 2001-277419 | 10/2001 |

* cited by examiner

*Primary Examiner*—Joseph K. McKane
*Assistant Examiner*—Robert Shiao
(74) *Attorney, Agent, or Firm*—Joseph C. Gil; Thomas W. Roy; Cary Matz

(57) ABSTRACT

The present invention relates to a process for producing an aliphatic oligocarbonate diol comprising a) reacting an aliphatic diol with dimethyl carbonate at an elevated pressure in a reaction mixture, and b) subsequently removing unreacted methanol and dimethyl carbonate under a reduced pressure to uncap the terminal OH groups.

28 Claims, No Drawings

PROCESS FOR PRODUCING ALIPHATIC OLIGOCARBONATE DIOLS

FIELD OF THE INVENTION

The present invention relates to a new process for producing aliphatic oligocarbonate diols by the transesterification of aliphatic diols with dimethyl carbonate (DMC) under elevated pressure. The process according to the invention also makes it possible to produce aliphatic oligocarbonate diols on a large industrial scale and with a high space-time yield (STY) from readily available DMC.

BACKGROUND OF THE INVENTION

Aliphatic oligocarbonate diols are important precursors for the production of plastics, lacquers and adhesives, for example. They are reacted with isocyanates, epoxides, (cyclic) esters, acids or acid anhydrides, for example. They can be produced from aliphatic diols by the reaction thereof with phosgene (e.g. DE-A 1 595 446), esters of bis-chlorocarbonic acid (e.g. DE-A 0 857 948), diaryl carbonates (e.g. DE-A 1 915 908), cyclic carbonates (e.g. DE-A 2 523 352: ethylene carbonate) or dialkyl carbonates (e.g. DE-A 2 555 805).

Of the carbonate sources, diphenyl carbonate (DPC), which is a diaryl carbonate, is particularly important, since aliphatic oligocarbonate diols of particularly high quality can be produced from DPC (e.g. U.S. Pat. No. 3,544,524, EP-A 0 292 772). In contrast to all other carbonate sources, DPC reacts quantitatively with aliphatic OH functions, so that after removing the phenol which is formed, all the terminal OH groups of the oligocarbonate diol are available for reaction, e.g. with isocyanate groups. Moreover, only very low concentrations of a soluble catalyst are required, so that the latter can remain in the product.

Processes based on DPC have the following disadvantages, however:

Only about 13% by weight of the DPC remains as CO groups in the oligocarbonate; the remainder is distilled off as phenol. A significantly higher proportion of dialkyl carbonates remains in the oligocarbonate, depending on the alkyl radical concerned. Thus about 31% by weight of dimethyl carbonate (DMC) is available as CO for the oligocarbonate, since the methanol which is distilled off has a molecular weight which is considerably lower than that of phenol.

Because high-boiling phenol (normal boiling point: 182° C.) has to be separated from the reaction mixture, it is only diols with a boiling point considerably higher than 182° C. which can be used in the reaction, in order to prevent unwanted removal of the diol by distillation.

Due to their ease of production, dialkyl carbonates, particularly dimethyl carbonate (DMC), are distinguished as starting materials by being more readily available. For example, DMC can be obtained by direct synthesis from MeOH and CO (e.g. EP-A 0 534 454, DE-A 19 510 909).

Numerous publications (e.g. U.S. Pat. Nos. 2,210,817, 2,787,632, EP-A 364 052) relate to the reaction of dialkyl carbonates with aliphatic diols:

In the prior art, aliphatic diols are placed in a vessel together with a catalyst and the dialkyl carbonate (e.g. diethyl carbonate, dibutyl carbonate, diallyl carbonate), and the resulting alcohol (e.g. ethanol, butanol, allyl alcohol) is distilled off from the reaction vessel via a column. In the column, the higher boiling, dialkyl carbonate is separated from the lower boiling alcohol and is recycled to the reaction mixture.

Despite its ready availability, the use of dimethyl carbonate (DMC) for the production of aliphatic oligocarbonate diols has only recently become known (e.g. U.S. Pat. No. 5,171,830, EP-A 798 327, EP-A 0 798 328, DE-A 198 29 593).

EP-A 0 798 328 describes the reaction of the corresponding diol component with DMC with distillation of the azeotrope under normal pressure. Uncapping is subsequently effected by vacuum distillation, wherein degrees of utilization of the terminal OH groups of about 98% are achieved under very drastic vacuum conditions (1 torr, about 1.3 mbar) (EP-A 0 798 328: Table 1).

EP-A 0 798 327 describes a corresponding two-step process in which a diol is first reacted with an excess of DMC, with distillation of the azeotrope under normal pressure, to form an oligocarbonate, the terminal OH groups of which are present as methoxycarbonyl terminal groups and are completely inaccessible. After removing the catalyst and distillation of the excess DMC under vacuum (65 torr, 86 mbar) the oligocarbonate diol is obtained in a second step by the addition of further amounts of the diol and of a solvent (e.g. toluene) as an entraining agent for the methanol formed. The remainder of the solvent then has to be distilled off under vacuum (50 torr, 67 mbar). The disadvantages of this process are the cost of conducting it by the use of a solvent, and the repeated distillation which is required, as well as the very high consumption of DMC.

DE-A 198 29 593 teaches the reaction of a diol with DMC, with the methanol formed being distilled off under normal pressure. Apart from a single mention of the word "azeotrope" in the table headed "Process diagram of the process according to the invention", no consideration is given there to the overall problem of the azeotrope. It can be calculated from the examples that DMC is used in excess and is azeotropically distilled off. About 27.8% by weight of the DMC used is lost.

According to U.S. Pat. No. 5,171,830, a diol is first heated with DMC and volatile constituents are then (azeotropically) distilled off. After vacuum distillation under drastic conditions (1 torr, 1.3 mbar), take-up of the product in chloroform, precipitation of the product with methanol and drying the product, an oligocarbonate diol is obtained in a yield of 55% by weight theoretical (loc. cit., Example 6). The degree of utilization of the terminal OH groups and the azeotrope problems are not considered in detail. Although U.S. Pat. No. 5,171,830 mentions, in column 5, lines 24 to 26, that the process can be conducted under vacuum, at normal pressure and at elevated pressures, and therefore can be conducted under all pressures, the particular preferences regarding the conditions of pressure employed cannot be identified. It is only a procedure which employs reduced pressure for the removal of volatile constituents which is mentioned.

Therefore, in the above publications, which were known hitherto, there is no description of a process, which is simple to carry out industrially, for the reaction of DMC with aliphatic diols to form oligocarbonate diols with high space-time yields and with high degrees of utilization of the terminal OH groups.

It is an object of the present invention to provide a simple, productive process, which can also be carried out on a large industrial scale, and which enables oligocarbonate diols to be produced by the transesterification of aliphatic diols with dimethyl carbonate, optionally with the use of an amount of catalyst which is low enough for the latter to remain in the product after completion of the reaction, with good space-time yields and with a high degree of uncapping of the terminal OH groups, in simple apparatuses.

It has now been found that the production of aliphatic oligocarbonate diols by the reaction of aliphatic diols with dimethyl carbonate, with the reaction optionally being accelerated by catalysts, at elevated pressure, results in a high space-time yield. In order to complete the reaction and in order to uncap the terminal OH groups (render the latter utilizable), the final residues of methanol and traces of dimethyl carbonate are removed from the product under reduced pressure, optionally with the introduction of inert gas.

SUMMARY OF THE INVENTION

The invention relates to a process for producing an aliphatic oligocarbonate diol comprising a) reacting an aliphatic diol with dimethyl carbonate at an elevated pressure, and b) subsequently removing unreacted methanol and dimethyl carbonate under a reduced pressure to uncap the terminal OH groups.

The present invention also relates to a process of making a polymeric material comprising reacting the oligocarbonate diol.

DETAILED DESCRIPTION OF THE INVENTION

The process according to the invention is conducted under elevated pressure, preferably under a pressure of 1.5 to 100 bar and more preferably under a pressure of 3 to 16 bar and—depending on the pressure employed—at temperatures from 100 to 300° C., preferably at temperatures from 160 to 240° C.

At a constant catalyst concentration, an elevated pressure results in a better conversion of DMC and in a shortening of the reaction times, which has a positive effect on the space-time yield.

Completion of the reaction and uncapping of the terminal OH groups (rendering the latter utilizable) are achieved by removing the final residues of methanol and traces of dimethyl carbonate under reduced pressure. In one preferred embodiment, completion the reaction and uncapping of the terminal OH groups (rendering the latter utilizable) are effected by introducing an inert gas (e.g. $N_2$) into the oligocarbonate diol under what is only a slight vacuum of about 150 mbar. The gas bubbles are saturated with methanol or DMC and the methanol is thus almost completely expelled from the reaction batch. By stripping with an inert gas to remove methanol, the equilibrium can be further displaced in favour of the product, the transesterification is completed and the terminal groups are thus rendered utilizable. The quality of the resulting oligocarbonate diol can be raised to the level of f DPC-based oligocarbonate diols, and the degree of uncapping of the terminal OH groups increases to more than 98%, preferably to 99.0 to 99.95%, most preferably to 99.5 to 99.9%.

Gas bubbles can be produced by introducing inert gases such as nitrogen, noble gases such as argon, or methane, ethane, propane, butane, dimethyl ether, dry natural gas or dry hydrogen into the reactor, wherein part of the gas stream which leaves the oligocarbonate and which contains methanol and dimethyl carbonate can be rerouted to the reaction of the oligocarbonate for completion of the reaction. Nitrogen is preferably used. Air can be used if products of low standard with respect to color are to be made.

Gas bubbles can also be produced by introducing inert, low boiling liquids such as pentane, cyclopentane, hexane, cyclohexane, petroleum ether, diethyl ether or methyl tert-butyl ether, etc., wherein these substances can be introduced in liquid or gaseous form, and part of the gas stream which leaves the oligocarbonate and which contains methanol and dimethyl carbonate can be recycled to the oligocarbonate for saturation.

The substances for producing gas bubbles can be introduced into the oligocarbonate via simple immersion tubes, preferably by means of annular nozzles or gasification agitators. The degree of utilization of the terminal OH groups which is achieved depends on the duration of uncapping, and on the amount, size and distribution of the gas bubbles: with increasing duration of uncapping and better distribution (e.g. better distribution and a larger phase boundary, due to a larger number of smaller gas bubbles when the latter are introduced via a gasification agitator) the degree of utilization is better. When introducing nitrogen, for example (e.g. at 150 mbar, 8 kettle volumina/hour), using a gasification agitator, a degree of utilization of about 99% is achieved after one hour, and a degree of utilization of about 99.8% is achieved after about 5 to 10 hours.

Uncapping, optionally assisted by the introduction of inert gas bubbles into the reaction mixture, is conducted at temperatures from 160° C. to 250° C., preferably at temperatures from 200° C. to 240° C., and under pressures from 1 to 1000 mbar, preferably under pressures from 30 to 400 mbar, most preferably under pressures from 70 to 200 mbar.

During the production of oligocarbonate diols, DMC is distilled off during the production process. The amount of DMC which has been removed by distillation from the reaction batch is determined by determining the DMC content of the distillate. This missing amount has to be made up before stripping off the methanol with inert gases under vacuum to make the terminal groups utilizable. A mixture of DMC and methanol forms again. The DMC which is lost by the stripping can be added again, and another part is distilled off again. With each addition the amount of DMC which is distilled off becomes less, and the desired stoichiometry is thereby approached.

This costly procedure can be simplified by combining the individual addition steps. The amounts of DMC which were distilled off can be measured in previous batches made with individual addition steps. It is therefore possible subsequently to add the complete amount of DMC together in a single step.

Thus the total amount of DMC required, namely the sum of the amount which is predetermined by the stoichiometry of the desired product together with the amount of DMC which is distilled off whilst the reaction is conducted, is added directly in the first step.

During the distillation of the methanol and the uncapping of the OH terminal groups at the end of the reaction when inert gas bubbles are introduced, a small amount of DMC is lost. This amount has to be taken into account beforehand by the addition of DMC. The requisite amount can be determined from previous batches, based on experience.

In one preferred process variant, an excess of DMC is added at the start of the reaction which is calculated so that after distilling off the azeotrope and after uncapping, a product is formed which comprises the complete functionality of the terminal OH groups, but which has a degree of polymerisation which is too high. A correction is then made by adding a further amount of the diol component and by conducting a brief transesterification step again. The correction amount can firstly be determined via the mass balance—by determining the amount of DMC in all the distillates and making a comparison with the total amount added—or from a measurable property (e.g. OH number, viscosity, average molecular weight, etc.) of the product, the degree of polymerisation of which is too high. Renewed uncapping is not necessary after this correction, since all the terminal OH groups are already freely available before the correction, and the addition of the diol components does not result in renewed capping.

Correction by the addition of DMC, after uncapping by gasification with an inert gas for a product which contains too little DMC, results in renewed capping.

According to the invention, the diols and optionally the catalysts which are present, are placed in a reaction vessel, the reactor is heated, the pressure is applied and DMC is subsequently metered in.

In one embodiment of the invention the process according to the invention therefore comprises the following steps:

Placing the diol components and optionally the catalyst in a vessel.

Heating and application of pressure.

Introduction and reaction of the DMC. The amount of DMC is calculated so that after removal by distillation in all steps (addition of DMC and uncapping) it is just the requisite amount of DMC or alternatively a slight excess thereof which remains in the reaction solution. Metered addition can be conducted according to two different strategies:

a) The complete amount of DMC is metered in rapidly in one step. As a consequence, the STY is optimised. A DMC-methanol mixture is distilled off which has a relatively high DMC content (e.g. the azeotrope), which is considerably less than that obtained in a pressureless procedure.

b) The DMC is metered in in two partial steps. The DMC is first metered in slowly, so that DMC-methanol mixtures with low DMC contents are distilled off. Not until a later point in time, when the DMC content in the distillate significantly increases, even at the same slow rate of addition, is the DMC rapidly metered in, so that a distillate with a high DMC content (e.g. a DMC-methanol azeotrope) is formed.

Procedure b) results in better utilization of the DMC and in an inferior STY.

Uncapping: rendering the terminal OH groups utilizable by extracting the final residues of methanol and DMC under reduced pressure, optionally by the production of gas bubbles (e.g. by the introduction of inert gases such as $N_2$).

Correction: correction of the stoichiometry, if necessary, by adding further amounts of the diol components and another brief transesterification.

It is also possible, of course, for the process according to the invention to be conducted with an excess of diol. In a procedure of this type, a correction subsequently has to be made wit DMC. This then results in a repeated uncapping step.

In a further embodiment of the invention up to 100%, preferably up to 70%, more preferably up to 50% and most preferably up to 30% of the DMC is placed in the reaction vessel at the start, together with the diols and the catalyst which is optionally present. The reactor is subsequently closed, heated and pressure is applied. All the distillate is first recirculated to the reactor. The DMC content can be determined by taking a sample from the distillate stream. Depending on the optimisation target (DMC yield or STY), a reflux ratio of 100% can be employed until a minimal DMC content in the distillate is achieved, or a defined time is fixed at which a changeover is made to distillation (a DMC/methanol mixture is distilled off). The residual DMC is subsequently metered in, uncapped, and any necessary correction to the stoichiometry is made by adding further amounts of the diol components and by a renewed, brief transesterification.

Suitable aliphatic diols preferably have 3 to 20 C atoms in their chain. Examples include 1,7-heptanediol, 1,8-octanediol, 1,6-hexanediol, 1,5-pentanediol, 1,4-butanediol, 1,3-butanediol, 1,3-propanediol, 2-methyl-1,3-propanediol, 3-methyl-1,5-pentanediol, 2-methylpentanediol, 2,2,4-trimethyl-1,6-hexanediol, 3,3,5-trimethyl-1,6-hexanediol, 2,3,5-trimethyl-1,6-hexanediol, cyclohexane-dimethanol, and others, as well as mixtures of different diols.

Addition products of diols with lactones (ester diols) can also be used, such as caprolactone, valerolactone etc., as can mixtures of diols with lactones, wherein it is not necessary initially to transesterify a lactone and diols.

Moreover, addition products of diols with dicarboxylic acids can also be used, such as: adipic acid, glutaric acid, succinic acid, malonic acid, etc., or esters of dicarboxylic acids and also mixtures of diols with dicarboxylic acids or with esters of dicarboxylic acids, wherein it is not necessary initially to transesterify a dicarboxylic acid and diols.

Polyether polyols can also be used, such as polyethylene glycol, polypropylene glycol and polybutylene glycol, as can polyether polyols which are obtained by the copolymerisation of ethylene oxide and propylene oxide for example, or polytetramethylene glycol which is obtained by the ring-opening polymerisation of tetrahydrofuran (THF).

Mixtures of different diols, lactones and dicarboxylic acids can be used.

1,6-hexanediol, 1,5-pentanediol and/or mixtures of 1,6-hexanediol and caprolactone are preferably used in the process according to the invention.

ε-caprolactone esters are preferably formed in situ, without prior reaction, from the raw materials during the production of oligocarbonate diol.

In principle, all soluble catalysts which are known for transesterification reactions can optionally be used as catalysts (homogeneous catalysis), and heterogeneous transesterification catalysts can also be used. The process according to the invention is preferably conducted in the presence of a catalyst.

Hydroxides, oxides, metal alcoholates, carbonates and organometallic compounds of metals of main groups I, II, III and IV of the periodic table of the elements, of subgroups III and IV, and elements from the rare earth group, particularly compounds of Ti, Zr, Pb, Sn and Sb, are particularly suitable for the process according to the invention.

Suitable examples include: LiOH, $Li_2CO_3$, $K_2CO_3$, KOH, NaOH, KOMe, NaOMe, MeOMgOAc, CaO, BaO, KOt-Bu, $TiCl_4$, titanium tetraalcoholates or terephthalates, zirconium tetraalcoholates, tin octoate, dibutyltin dilaurate, dibutyltin, bistributyltin oxide, tin oxalate, lead stearate, antimony trioxide, zirconium tetraisopropylate, etc.

Aromatic nitrogen heterocycles can also be used in the process according to the invention, as can tertiary amines corresponding to $R_1R_2R_3N$, where $R_{1-3}$ independently represents a $C_1$–$C_{30}$ hydroxyalkyl, a $C_4$–$C_{10}$ aryl or a $C_1$–$C_{30}$ alkyl, particularly trimethylamine, triethylamine, tributylamine, N,N-dimethylcyclohexylamine, N,N-dimethyl-ethanolamine, 1,8-diaza-bicyclo-(5.4.0)undec-7-ene, 1,4-diazabicyclo-(2.2.2)octane, 1,2-bis(N,N-dimethyl-amino)-ethane, 1,3-bis(N-dimethyl-amino)propane and pyridine.

Alcoholates and hydroxides of sodium and potassium (NaOH, KOH, KOMe, NaOMe), alcoholates of titanium, tin or zirconium (e.g. $Ti(OPr)_4$), as well as organotin compounds are preferably used, wherein titanium, tin and zirconium tetraalcoholates are preferably used with diols which contain ester functions or with mixtures of diols with lactones.

In the process according to the invention, the homogeneous catalyst is used in concentrations (expressed as percent by weight of metal with respect to the aliphatic diol used) of up to 1000 ppm (0.1%), preferably between 1 ppm and 500 ppm (0.05%), most preferably between 5 ppm and 100 ppm (0.01%). After the reaction is complete, the catalyst can be left in the product, or can be separated, neutralized or masked. The catalyst is preferably left in the product.

The molecular weight of the oligocarbonate diols produced by the process according to the invention can be adjusted via the molar ratio of diol to DMC, wherein the molar ratio of diol/DMC can range between 1.01 and 2.0, preferably between 1.02 and 1.8, and most preferably between 1.05 and 1.6. The aforementioned ratio, of course, describes the stoichiometry of the product, i.e., the effective ratio of diol to DMC after distilling off the DMC-methanol mixtures. The amounts of DMC which are used in each case are correspondingly larger due to the azeotropic distillation of the DMC. The calculated number-average molecular weights of the oligocarbonate diols produced by the process according to the invention then range, e.g. when 1,6-hexanediol is used as the diol component, between 260 and 15,000 g/mol, preferably between 300 and 7300 g/mol, most preferably between 350 and 3000 g/mol. If a diol of higher or lower molecular weight is used, the molecular weights of the oligocarbonate diols produced according to the invention are correspondingly higher or lower.

The process according to the invention makes it possible to produce oligocarbonate diols of formula HO—$R_1$—[—O—CO—O—$R_1$—]$_n$—OH which have carbon numbers from 7 to 1300, preferably from 9 to 600, most preferably from 11 to 300, in which $R_1$ is the symbol for aliphatic diols with 3 to 50 carbon atoms, preferably 4 to 40, and more preferably from 4 to 20 carbon atoms.

The diols can additionally contain ester, ether, amide and/or nitrile functions. Diols or diols with ester functions are preferred, such as those which are obtained by the use of caprolactone and 1,6-hexanediol. If two or more diol components are used (e.g. mixtures of different diols or mixtures of diols with lactones), two adjacent $R_1$ groups in a molecule can definitely be different from each other (random distribution).

The process according to the invention enables high quality oligocarbonate diols to be produced from DMC with good space-time yields and with a low degree of capping of their terminal OH groups.

The oligocarbonate diols which are produced by the process according to the invention can be used, for example, for the production of plastics polymers, fibres, coatings, lacquers and adhesives, e.g. by reaction with isocyanates, or for the production of epoxides, (cyclic) esters, acids or acid anhydrides. They can be used as binder vehicles, binder vehicle constituents and/or as reactive thinners in polyurethane coatings. They are suitable as components of moisture-hardening coatings, or as binder vehicles or binder vehicle constituents in solvent-containing or aqueous polyurethane coatings. They can also be used as building blocks for the synthesis of polyurethane prepolymers which contain free NCO groups, or in polyurethane dispersions.

The oligocarbonate diols which are produced by the process according to the invention can also be used for the production of synthetic thermoplastic materials such as aliphatic and/or aromatic polycarbonates, thermoplastic polyurethanes, etc.

The invention is further illustrated but is not intended to be limited by the following examples in which all parts and percentages are by weight unless otherwise specified.

EXAMPLES

Examples 1–6 according to the invention are examples of some synthesis of oligocarbonate diols with an OH number of 53–58 mg KOH/g and a residual methanol content of <10 ppm, produced by a pressurized procedure. The comparison example demonstrates a synthesis using a pressureless procedure.

Example 1

2316 kg 1,6-hexanediol, 2237 kg ε-caprolactone and 0.54 kg titanium tetraisopropylate were placed in a reaction vessel fitted with a cross-arm agitator. The pressure was increased to 5.2 bar (abs.) with nitrogen. The batch was subsequently heated to 205° C. over 3 hours. The pressure was held constant at 5.2 bar by means of a pressure control system. After the desired temperature was reached, 800 kg dimethyl carbonate were added over 4 hours via an immersion tube (about 200 kg/hour). At the same time, a distillate with a DMC content of about 11% was distilled off into a receiver. Thereafter, the temperature was reduced to 195° C., and a further 1200 kg dimethyl carbonate were metered in over 12 hours (about 100 kg/hour). After the metered addition of 400 kg of the 1200 kg, the DMC content in the distillate was about 15%, after the metered addition of 800 kg it was about 24%, and at the end of the metered addition it was about 29%. After 4 hours of further reaction, the temperature was increased to 200° C. and the pressure was reduced over 7 hours from 5.2 bar to 100 mbar. 10 Nm³ nitrogen were introduced via an immersed inlet tube. The residual methanol was removed. After 4 hours, the OH number was 42.5 mg KOH/g and the viscosity was 25,464 mPa.s. A further 80 kg 1,6-hexanediol were added. After a further 9 hours, the OH number was 50.0 mg KOH/g and the viscosity was 20,748 mPa.s. A further 50 kg 1,6-hexanediol were added. After a further 5 hours, the OH number was 57.9 mg KOH/g and the viscosity was 14,513 mPa.s. The residual methanol content was <10 ppm. The total run time was about 48 hours.

Example 2

2316 kg 1,6-hexanediol, 2237 kg ε-caprolactone, 0.54 kg titanium tetraisopropylate and 1000 g dimethyl carbonate were placed in a reaction vessel fitted with a cross-arm agitator. The pressure was increased to 5.2 bar (abs.) with nitrogen. The batch was subsequently heated to 180° C. over 2 hours. The pressure was held constant at 5.2 bar by means of a pressure control system. A slight reflux occurred, the liquid from which was returned to the vessel. 1 hour after reaching 180° C., the dimethyl carbonate content in the reflux was about 17%, and decreased to about 12.5% after a further 5 hours.

The apparatus was changed over to effect distillation into a receiver and the batch was heated to 194° C. Methanol with a DMC content of about 12% distilled over. After about 4 hours, the distillation was complete.

1000 kg dimethyl carbonate were added at a rate of 250 kg/hour via an immersion tube, and a methanol/DMC azeotrope with a DMC content of about 20–25% was distilled off. The batch was subsequently heated to 200° C. over 1 hour. After stirring for a further 2 hours, the pressure was reduced to 200 mbar over 7 hours. 8 Nm³ nitrogen were then introduced via an immersed inlet tube and the residual methanol was removed. After 6 hours, the OH number was 43.2 mg KOH/g and the viscosity was 23,371 mPa.s. 74 kg 1,6-hexanediol were then added. After a further 6 hours, the OH number was 48.8 mg KOH/g and the viscosity was 20,001 mPa.s. The residual methanol content was 20 ppm. A further 55 kg 1,6-hexanediol were added. After a further reaction time of 6 hours, the OH number was 56.5 mg KOH/g and the viscosity was 15,500 mPa.s. The residual methanol content was <10 ppm. The total run time was about 45 hours.

Example 3

A 200 liter stirred vessel with a paddle mixer was fitted with a packed column of length 2.5 m (o.d. 11 cm, filled with Pall packings), a condenser and a 100 liter receiver. The distillate caught in the receiver could be recycled to the reactor via a bottom pump and basal flange.

62,353 kg adipol, 60,226 kg ε-caprolactone, 12 g titanium tetraisopropylate and 23.5 kg DMC were placed in the reactor. After rendering the reactor atmosphere inert by evacuating it twice to 300 mbar and subsequently filling it with nitrogen, the batch was heated to 80° C. over 1 hour and homogenized. A pressure of 5.2 bar was set by filling with nitrogen under pressure, and the pressure was held constant by means of a pressure control system. The batch was subsequently heated to 194° C. over 2 hours, and the temperature was held constant for 2 hours.

A further 33.49 kg DMC were metered into the stirred vessel over 2 hours at 194° C. After adding the DMC, the batch was heated to 196° C. over 30 minutes and this temperature was held for 5 hours. The batch was subsequently heated to 200° C. over 30 minutes and the entire DMC/methanol mixture (31 kg, with a DMC content of 25.7%) was distilled off over 2 hours. The pressure was then reduced to 100 mbar over 1 hour and nitrogen was passed through the batch. After vacuum distillation for 7 hours at 100 mbar and 200° C. whilst passing nitrogen through the batch, an OH number of 60.3 mg KOH/g and a viscosity of 8,667 mPa.s (23° C.) were obtained, after a further 2 hours the OH number was 55.8 and the viscosity was 13,099 mPa.s, and after a further 7 hours the OH number was 53.7 and the viscosity was 15,794 mPa.s.

The run time was 40 hours and the DMC content in the distillate was 25.7%.

Example 4

9,267 kg 1,6-hexanediol and 0.13 g tetraisopropyl titanate were placed in a 20 liter pressure autoclave fitted with a cross-arm agitator, a column and a downstream condenser and receiver. After rendering the reactor atmosphere inert by evacuating it twice to 300 mbar and subsequently filling it with $N_2$, the pressure in the reactor and the peripheral parts thereof (column, condenser, receiver) was set to 5.2 bar with $N_2$. The batch was subsequently heated to 197° C. and 9.63 kg DMC was metered into the reactor over 6 hours. After the metered addition phase, the batch was heated to 200° C. and was distilled for 2 hours at this temperature. 6.17 kg of a distillate with a DMC content of 25.1% were obtained. The pressure was reduced to 100 mbar and nitrogen was passed through the batch. After 9 hours, an OH number of 159 mg KOH/g was obtained. The pressure was set to 5.2 bar again and 1 kg DMC were metered in over 1 hour. After the metered addition, the batch was first stirred for 2 hours, and the pressure was then reduced to 100 mbar again and the batch was distilled whilst passing nitrogen through it. After a further vacuum distillation for 18 hours at 100 mbar and 200° C., the OH number was 65.5 mg KOH/g. The pressure was increased to 5.2 bar, 96 g DMC were metered in, and the batch was stirred for 2 hours, depressurized, evacuated to 100 mbar and distilled whilst passing nitrogen through it. After 19 hours, a product was finally obtained which had an OH number of 56.0 mg KOH/g and a viscosity of 1,699 mPa.s (75° C.).

Example 5

Reactor: a 20 liter Hagemann reactor fitted with a cross-arm agitator, a column and a downstream condenser and receiver. Dimethyl carbonate was metered directly into the reactor via a diaphragm pump (not immersed).

6.68 kg 1,6-hexanediol (0.057 kmol), 6.45 kg ε-caprolactone (0.057 kmol) and 1 g tetraisopropyl titanate were placed in the reactor. After rendering the reactor atmosphere inert by evacuating it twice to 300 mbar and subsequently filling it with nitrogen, the batch was first heated to 80° C. over 1 hour and was then heated to 194° C. over 1 hour.

At 194° C., 6.14 kg dimethyl carbonate (0.068 kmol) were metered in over about 5 hours. After the metered addition was complete, the batch was held for 4 hours at 196° C. and the temperature was then increased to 200° C. After 2 hours at 200° C. the reactor was depressurized to normal pressure and the distillate which had passed over (2.9 kg) was removed from the receiver. After removing the distillate, the pressure was reduced to 100 mbar and nitrogen was passed through the batch. After 6 hours, a viscosity of 42,135 mPa.s and an OH number of 29.8 mg KOH/g were obtained. In order to achieve the desired OH number of 53–58 mg KOH/g, 0.413 kg 1,6-hexanediol were subsequently added, and the batch was held for a further 6 hours at 200° C. and at a pressure of 100 mbar whilst passing nitrogen through it. An OH number of 45.8 mg KOH/g and a viscosity 21,725 mPa.s were obtained. A further 0.150 kg adipol was added. After a further 8 hours, a viscosity of 18,330 mPa.s and an OH number of 56.8 mg KOH/g were obtained.

The total reaction time was about 36 hours.

Example 6

9270 kg 1,6-hexanediol, 8950 kg ε-caprolactone were placed at 100° C. in a reaction vessel fitted with a cross-arm agitator and a condenser. 1.5 kg titanium tetraisopropylate were added. The pressure was increased to 5.2 bar (abs.) with nitrogen. The batch was subsequently heated to 200° C. After the desired temperature was reached, 7300 kg dimethyl carbonate were equally added over 15 hours. At the same time the methanol formed was distilled off as a distillate with a DMC content of about 15–19% by weight. Thereafter, the temperature was reduced to 180° C., and the pressure was reduced over 3 hours to ambient pressure. The pressure is further reduced over 12 hours to 60 mbar. 2 $Nm^3/h$ nitrogen were introduced via an immersed inlet tube to take out residual methanol. The vacuum was further reduced to 20 mbar. After a further 24 hours at 180° C., the residual non-OH-endgroups (especially methylcarbonate groups) were less than 5 mol %. The reactor was cooled to 100° C., brought to ambient pressure and the product filtered. It yielded 20000 kg of a clear, colorless noncrystralline resin with an OH number of 56 mg KOH/g and a viscosity of 15,000 mPa.s at 23° C.

Comparison Example

Production of the product from Example 5 by a pressure-less procedure

Reactor: A 20 liter Hagemann reactor fitted with across-arm agitator, a column and a downstream condenser and receiver. Dimethyl carbonate was metered directly into the reactor via a diaphragm pump (not immersed).

6.68 kg 1,6-hexanediol (0.057 kmol), 6.45 kg ε-caprolactone (0.057 kmol) and 1 g tetraisopropyl titanate were placed in the reactor. After rendering the reactor atmosphere inert by evacuating it twice to 300 mbar and subsequently filling it with $N_2$, the batch was first heated to 80° C. over 1 hour and was then heated to 140° C. over a further 1 hour. At 140° C., 6.14 kg dimethyl carbonate (0.068 kmol) were metered in so that the column top temperature did not exceed 67° C. The time of metered addition was about 24 hours at a column bottom temperature of 140 to 182° C. After the metered addition was complete, the temperature was increased to 200° C. over about 1 hour. 4 hours after reaching 200° C., an OH number of 85.7 mg KOH/g was determined. The batch was cooled to 140° C. and was corrected with 0.357 kg of pure dimethyl carbonate whilst limiting the column top temperature to 65° C. The time of metered addition was about 3.5 hours. The batch was subsequently heated to 200° C. again over 2 hours. Thereafter, it was stirred for 3 hours at 200° C. under normal pressure and for 5 hours at 100 mbar. An OH number of 31.3 mg KOH/g and a viscosity of 33,320 mPa.s were obtained thereafter. In order to achieve the desired OH number, 0.395 kg adipol was subsequently added. After the reaction had again proceeded for about 3 hours at 200° C. at normal pressure, and for 7 hours at 100 mbar, the OH number was 52.5 mg KOH/g and the viscosity was 15,737 mPa.s.

The total reaction time was about 36 hours.

Compared with Example 5, the reaction time here was longer, the catalyst requirement was higher, and there was a greater loss of DMC.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing an aliphatic oligocarbonate diol comprising
    a) reacting an aliphatic diol with dimethyl carbonate (DMC), in a transesterification, at an elevated pressure in a reaction mixture,
    b) removing methanol and unreacted dimethyl carbonate under a reduced pressure, and
    c) completing the transesterification and uncapping the terminal OH groups by removing methanol and unreacted dimethyl carbonate under reduced pressure assisted by addition of an inert gas.

2. The process of claim 1 further comprising adding a catalyst.

3. The process of claim 1 further comprising adding the DMC to the diols in a reaction vessel after the reactor is heated and the pressure is applied.

4. The process of claim 3 comprising adding DMC slowly at first into the reactor, and later increasing the rate of addition to such an extent that a DMC/methanol azeotrope is distilled off.

5. The process of claim 1 comprising adding DMC rapidly in one step.

6. A process according to claim 1 comprising adding up to 100% of the requested amount of DMC to the diol, heating the reactor, applying the pressure, refluxing all the distillate to the reactor until a defined or constant DMC content is obtained in the distillate, distilling off the DMC/methanol mixture and adding the DMC that is lacking compared to the required amount.

7. The process of claim 1 wherein the elevated pressure is between 1.5 and 100 bar and the temperature is between 100 to 300° C.

8. The process of claim 7 wherein step b) is performed at a temperature from 160° C. to 250° C. and at a pressure from 1 to 1000 mbar.

9. The process of claim 1 comprising introducing the inert gas as bubbles into the reaction mixture.

10. The process of claim 1 wherein the inert gas is selected from the group consisting of nitrogen, noble gases, methane, ethane, propane, butane, dimethyl ethers, dry natural gas and dry hydrogen.

11. The process of claim 1 wherein the inert gas is prepared from a low-boiling liquid selected from the group consisting of pentane, cyclopentane, hexane, cyclohexane, petroleum ether, diethyl ether and methyl tert-butyl ether.

12. The process of claim 1 comprising removing methanol and unreacted dimethyl carbonate in a gas stream and partially recycling the gas stream to the oligocarbonate.

13. The process of claim 1 where the total amount of DMC is the sum of the theoretical amount of DMC to be reacted with the aliphatic diol plus the amount of DMC distilled off during the planned reaction time.

14. The process of claim 1 further comprising d) modification of the molecular weight of the aliphatic oligocarbonate by adding more diol components followed by another transesterification reaction.

15. The process of claim 1 wherein the aliphatic diol comprises 3 to 20 C. atoms.

16. The process of claim 1 wherein the aliphatic diol comprises an aliphatic ester diol.

17. The process of claim 16 wherein the aliphatic ester diol comprises an addition product of a diol with a lactone.

18. The process of claim 17 wherein the lactone is caprolactone or valerolactone.

19. The process of claim 16 wherein the aliphatic ester diol comprises a condensation product of a diol with a dicarboxylic acid.

20. The process of claim 19 wherein the dicarboxylic acid is adipic acid, glutaric acid, succinic acid, or malonic acid.

21. The process of claim 1 wherein the aliphatic diol comprises a polyether polyol.

22. The process of claim 1 wherein the aliphatic diol is polyethylene glycol, polypropylene glycol or polybutylene glycol.

23. The process of claim 1 wherein the aliphatic diol is 1,6-hexanediol, 1,5-pentanediol and/or mixtures of 1,6-hexanediol and caprolactone.

24. The process of claim 16 wherein the aliphatic ester diol is formed in situ during the production of the aliphatic oligocarbonate diol.

25. The process of claim 1, wherein the molar ratio of diol to DMC in the reaction mixture ranges between 1.01 and 2.0.

26. The process of claim 2 wherein the catalyst is a soluble transesterification catalysts.

27. The process of claim 26 wherein the soluble transesterification catalyst is used in concentrations up to 1000 ppm.

28. The process of claim 2 wherein the catalyst is an unsoluble transesterification catalysts.

* * * * *

UNITED STATES PATENT AND TRADEMARK OFFICE
CERTIFICATE OF CORRECTION

PATENT NO. : 6,818,784 B2
DATED : November 16, 2004
INVENTOR(S) : Jörg Tillack et al.

It is certified that error appears in the above-identified patent and that said Letters Patent is hereby corrected as shown below:

Column 11,
Line 50, delete "The process of Claim 7" and insert -- The process of Claim 1 --.

Signed and Sealed this

Twelfth Day of April, 2005

JON W. DUDAS
*Director of the United States Patent and Trademark Office*